(12) United States Patent
Chen et al.

(10) Patent No.: US 12,083,505 B2
(45) Date of Patent: Sep. 10, 2024

(54) METAL-SEMICONDUCTOR HYBRID STRUCTURES, SYNTHESES THEREOF, AND USES THEREOF

(71) Applicant: Honda Motor Co., Ltd., Tokyo (JP)

(72) Inventors: Shutang Chen, Livermore, CA (US); Gugang Chen, Palo Alto, CA (US)

(73) Assignee: HONDAN MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/212,559

(22) Filed: Jun. 21, 2023

(65) Prior Publication Data

US 2024/0116035 A1    Apr. 11, 2024

Related U.S. Application Data

(63) Continuation of application No. 17/899,535, filed on Aug. 30, 2022, now Pat. No. 11,717,809, which is a
(Continued)

(51) Int. Cl.
*B01J 23/52* (2006.01)
*B01J 23/42* (2006.01)
(Continued)

(52) U.S. Cl.
CPC ............... *B01J 23/52* (2013.01); *B01J 23/42* (2013.01); *B01J 23/44* (2013.01); *B01J 27/04* (2013.01);
(Continued)

(58) Field of Classification Search
CPC ... B01J 23/52; B01J 35/40; B01J 23/42; B01J 23/44; B01J 27/04; B82Y 30/00; B82Y 40/00
(Continued)

(56) References Cited

U.S. PATENT DOCUMENTS 11,458,461 B2 * 10/2022 Chen .................... B01J 27/04
11,717,809 B2 *  8/2023 Chen .................... B01J 35/40
                                                           75/338
(Continued)

FOREIGN PATENT DOCUMENTS

CN        109706475 A       5/2019
CN        110461467 A      11/2019
(Continued)

OTHER PUBLICATIONS

Meng Zhou, Chengjie Zeng, Yuxiang Chen, Shuo Zhao, Mattew Y. Sfeir, Manzhou Zhu, Rongchao Jin, Evolution from the plasmon to exciton state in ligand-protected atomically precise gold nanoparticles, Nature Communication, 2016, 7, 13420.
(Continued)

*Primary Examiner* — Patricia L. Hailey
(74) *Attorney, Agent, or Firm* — Patterson + Sheridan, LLP (57) ABSTRACT

Aspects of the present disclosure generally relate to semiconductor nanoparticles, metal-semiconductor hybrid structures, processes for producing semiconductor nanoparticles, processes for producing metal-semiconductor hybrid structures, and processes for producing conversion products. In an aspect is provided a process for producing a metal-semiconductor hybrid structure that includes introducing a first precursor comprising a metal from Group 11-Group 14 to an amine and an anion precursor to form a semiconductor nanoparticle comprising the Group 11-Group 14 metal; introducing a second precursor comprising a metal from Group 7-Group 11 to the semiconductor nanoparticle to form a metal-semiconductor mixture; and introducing the metal-semiconductor mixture to separation conditions to produce the metal-semiconductor hybrid structure. In another aspect is provided a metal-semiconductor hybrid structure that includes a first component comprising a metal
(Continued)

from Group 11-Group 14 and an element from Group 15-Group 16; and a second component comprising a metal from Group 7-Group 11.

20 Claims, 5 Drawing Sheets

Related U.S. Application Data continuation of application No. 17/001,078, filed on Aug. 24, 2020, now Pat. No. 11,458,461.

(51) Int. Cl.
| | | |
|---|---|---|
| *B01J 23/44* | (2006.01) | |
| *B01J 27/04* | (2006.01) | |
| *B01J 35/40* | (2024.01) | |
| *B82Y 30/00* | (2011.01) | |
| *B82Y 40/00* | (2011.01) | |

(52) U.S. Cl.
CPC .............. *B01J 35/40* (2024.01); *B82Y 30/00* (2013.01); *B82Y 40/00* (2013.01)

(58) Field of Classification Search
USPC .................................................. 502/102, 300
See application file for complete search history.

(56) References Cited

U.S. PATENT DOCUMENTS

| | | |
|---|---|---|
| 2014/0339072 A1 | 11/2014 | Jennings et al. |
| 2022/0055020 A1 | 2/2022 | Chen et al. |

FOREIGN PATENT DOCUMENTS

| | | |
|---|---|---|
| CN | 114082424 A | 2/2022 |
| JP | 2007307702 A | 11/2007 |
| KR | 20140070701 A | 6/2014 |
| WO | 2011033510 A2 | 3/2011 |
| WO | 2016058862 A1 | 4/2016 |

OTHER PUBLICATIONS

Yuanxin Du, Hongting Sheng, Didier Astruc, Manzhou Zhu, Atomically precise noble metal nanoclusters as efficient catalysts: A bridge between structure and properties, Chem. Rev., 2020, 120, 526-622.
Cheng-An J Lin, Chih-Hsien Lee, Jyun-Tai Hsieh, Hsueh-Hsiao Wang, Jimmy K Li, Ji-Lin Shen, Wen-Hsiung Chan, Hung-I Yeh, Walter H. Chang, Synthesis of fluorescent metallic nanoclusters toward biomedical application: recent progress and present challenge, Journal of medical and biological engineering, 2009, 29, 276-283.
Chih-Ching Huang, Zusing Yang, Kun-Hong Lee, Huan-Tsung Chang, Synthesis of highly fluorescent gold nanoparticles for sensing mercury(II), Angewandte Chemie International Edition, 46: 6824-6828, 2007.
Rongchao Jin, Chenjie Zeng, Meng Zhou, and Yuxiang Chen, Atomically precise colloidal metal nanoclusters and nanoparticles: fundamentals and opportunities, Chem. Rev. 2016, 116, 10346?10413.
Junling Lu, Ke-bin Low, Yu Lei, Joseph A. Libera, Alan Nicholls, Peter C. Stair, Jeffrey W Elam, Toward atomically-precise synthesis of supported bimetallic nanoparticles using atomic layer deposition, Nature communications, 2014, 5, 3264.
Rongchao Jin, Quantum sized, thiolate-protected gold nanoclusters, Nanoscale, 2010, 2, 343-362.
Meng Zhou, Tatsuya Higaki, Guoxiang Hu, Matthew Y. Sfeir, Yuxiang Chen, De-en Jiang, Rongchao Jin, Three-orders-of-magnitude variation of carrier lifetimes with crystal phase of gold nanoclusters, Science, 2019, 364, 279-282.
Shutang Chen, Xiaoling Zhang, Qiuhua Zhang, and Weihong Tan, Trioctylphosphine as both solvent and ligand to synthesize CdS nanorod, Nanoscale Research Letters, 2009, 4, 1159-1164.
Ken-Tye Yong, Yudhisthira Sahoo, Mark T. Swihart, and Paras N. Prasad, Shape control of Cds nanocrystals in one-pot synthesis, Journal of Physical Chemistry C, 2007, 111, 2447-2458.
Shutang Chen, Samir V. Jenkins, Jing Tao, Yimei Zhu, Jingyi Chen, "Anisotropic seeded growth of Cu-M (M=Au, Pt, or Pd) bimetallic nanorods with tunable optical and catalytic properties", Journal of Physical Chemistry C, 2013, 117, 8924-8932.
Chinese Office Action dated Dec. 13, 2023 for Application No. 202110957398.8.

* cited by examiner

METAL-SEMICONDUCTOR HYBRID STRUCTURES, SYNTHESES THEREOF, AND USES THEREOF

CROSS-REFERENCES TO RELATED APPLICATIONS

This application is a continuation of co-pending U.S. patent application Ser. No. 17/899,535, filed Aug. 30, 2022, which is a continuation of U.S. patent application Ser. No. 17/001,078, filed Aug. 24, 2020, now U.S. Pat. No. 11,458,461, all of which are herein incorporated by reference in their entirety.

FIELD

Aspects of the present disclosure generally relate to semiconductor nanoparticles, metal-semiconductor hybrid structures, processes for producing semiconductor nanoparticles, processes for producing metal-semiconductor hybrid structures, and processes for producing conversion products.

BACKGROUND

Metal nanoclusters, and particularly small-sized metal nanoclusters (less than 3 nm), have been broadly applied in energy catalysis, biomedical imaging, and sensing applications because of their large surface area and efficient atom-utilization. Because of their broad application, efforts have been made toward developing simple and economic strategies to synthesize the small-sized metal nanoclusters.

One conventional method to synthesize metal nanoclusters on nanoparticle surfaces, e.g., metal-semiconductor hybrid structures, is physical vapor deposition (PVD). PVD methods typically employ an ultra-high vacuum to deposit metal nanoclusters on nanoparticle surfaces. Although PVD methods can provide some control over the size of the nanocluster, the use of an ultra-high vacuum and expensive instrumentation does not provide commercially viable scale-up. Such complications and high production costs render PVD methods uneconomical and unsuitable for high-volume manufacturing. One conventional method to synthesize metal nanoclusters is solution synthesis using gold-thiolate (SR) systems. A key disadvantage of this method is the strength, and the absorption energy, of the Au—SR bond. Due to its strong absorption ability with the gold atom, thiolate slows down the nucleation and growth rate of gold precursors on surfaces. Another disadvantage of solution synthesis is the inability to control the size of the metal nanoclusters.

There is a need for improved processes for producing metal-semiconductor hybrid structures that overcome one or more deficiencies of conventional methods.

SUMMARY

In an aspect is provided a process for producing a metal-semiconductor hybrid structure that includes introducing, under first conditions, a first precursor comprising a metal from Group 11-Group 14 to an amine and an anion precursor to form a semiconductor nanoparticle comprising the Group 11-Group 14 metal. The process can further include introducing, under second conditions, a second precursor comprising a metal from Group 7-Group 11 to the semiconductor nanoparticle to form a metal-semiconductor mixture, the metal of the first precursor being the same or different than the metal of the second precursor. The process can further include introducing the metal-semiconductor mixture to separation conditions to produce the metal-semiconductor hybrid structure.

In another aspect is provided a metal-semiconductor hybrid structure that includes a first component comprising a metal from Group 11-Group 14 and an element from Group 15-Group 16, and a second component comprising a metal from Group 7-Group 11. The Group 11-Group 14 metal of the first component is the same or different than the Group 7-Group 11 metal of the second component, an average size of the first component is from about 3 nm to about 20 nm as determined by transmission electron microscopy, and an average size of the second component is from about 0.5 nm to about 3 nm as determined by transmission electron microscopy.

In another aspect is provided a process for converting carbon dioxide to a conversion product that includes introducing carbon dioxide to a metal-semiconductor hybrid structure, and obtaining the conversion product.

In another aspect is provided a process for converting 4-nitrophenol to a conversion product that includes introducing 4-nitrophenol to a metal-semiconductor hybrid structure, and obtaining the conversion product.

In another aspect is provided a material that includes a first component comprising a metal from Group 11-Group 14 and an element from Group 15-Group 16, and a second component comprising a metal from Group 7-Group 11. The Group 11-Group 14 metal of the first component is the same or different than the Group 7-Group 11 metal of the second component, an average size of the first component is from about 3 nm to about 20 nm as determined by transmission electron microscopy, and an average size of the second component is from about 0.5 nm to about 3 nm as determined by transmission electron microscopy.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only exemplary aspects and are therefore not to be considered limiting of its scope, for the disclosure may admit to other equally effective aspects.

To facilitate understanding, identical reference numerals have been used, where possible, to designate identical elements that are common to the figures. It is contemplated that elements and features of one example may be beneficially incorporated in other examples without further recitation.

DETAILED DESCRIPTION

Aspects of the present disclosure generally relate to semiconductor nanoparticles, metal-semiconductor hybrid structures, processes for producing semiconductor nanoparticles, processes for producing metal-semiconductor hybrid structures, and processes for producing conversion products. The inventors have discovered processes for producing small-sized (e.g., less than about 3 nm) metal nanoclusters on nanoparticle surfaces. Such metal nanoclusters on nanoparticle surfaces may be referred to as metal-semiconductor hybrid structures.

In contrast to conventional methods, processes of the present disclosure can provide accurate control over the size of the metal nanoclusters and nanoparticle surfaces and can enable high throughput of such compositions. Unlike PVD methods which use expensive instrumentation and ultra-high vacuums to form metal nanoclusters, processes of the present disclosure can tolerate easy scale-up with much lower production costs, while at the same time producing small-sized metal nanoclusters. Moreover, problems of the metals being quickly oxidized during formation of the nanoclusters using PVD methods is eliminated, or at least reduced, by the processes described herein. As such, the processes described herein are economical and suitable for scale-up and high-volume manufacturing.

In addition, processes of the present disclosure provide control over the size of the metal nanocluster to, e.g., less than about 3 nm, such as less than about 2 nm. Such small-sized metal nanoclusters have a large surface area of active metal sites available to catalyze desired reactions, e.g., reduction reactions and hydrogen evolution reactions. Maximizing the accessible surface area on a per mass basis can provide significantly reduced production costs. As such, the nanoclusters of the present disclosure can provide higher catalyst activity and improved atom economy over nanoclusters formed by conventional methods.

In contrast to the solution synthesis method using gold-thiolate (SR) systems where the strong bond energy of the Au—SR slows down the growth rate of gold nanoclusters, aspects of the present disclosure can employ weaker ligands to synthesize and stabilize the metal nanoclusters. The weak ligands may provide, at least, a faster reaction time and higher throughput when synthesizing the metal-semiconductor hybrid structures, as compared to conventional methods.

The structures prepared by processes of the present disclosure are also different than those prepared by conventional methods. For example, conventional solution approaches have the ability to prepare only individual metal nanoclusters. However, processes of the present disclosure can provide production of hybrid structures. Such hybrid structures not only include the metal nanoclusters, but also include a semiconductor nanoparticle support. As such, hybrid structures of the present disclosure can exhibit advantages by the combination of the metal nanocluster and the semiconductor nanoparticle.

Further, the physical properties of the metal-semiconductor hybrid structures are improved over those made by conventional methods. Because a metal-semiconductor hybrid structure contains both a metal and a semiconductor as well as their interaction, compared to a single component metal nanocluster from PVD and solution synthesis, there are additional physical properties such as optical properties can be utilized for various applications. Such physical properties include electrochemical, optical, and electrical properties and can provide use of the metal-semiconductor hybrid structures in various applications. As non-limiting examples, the metal nanoclusters of the present disclosure can facilitate electron-hole separation in applications such as gas sensing, water splitting, and biological applications. For instance, the metal-semiconductor hybrid structures exhibit photoluminescence properties such that the structures can be useful for biomedical and other biological applications. As another example, the metal-semiconductor hybrid structures described herein can be useful for gas sensing. Gases, such as hydrogen sulfide ($H_2S$) can interact with the metal-semiconductor hybrid structures such that the conductivity and photoluminescence properties of the metal-semiconductor hybrid structures can change with the concentration of the gas. Further, as compared to metal nanoclusters made via PVD, the metal-semiconductor hybrid structure can enhance or quench the photoluminescence property of semiconductor when adjusting the size of metal cluster, but metal nanocluster through PVD and solution synthesis only has a metal optical property.

Compared to conventional products of individual nanoclusters, the improved properties of the metal-semiconductor hybrid structures can provide for their use in such gas sensing applications. For example, a film comprising the metal-semiconductor hybrid structures can be used to detect gases through colorimetric, conductive, and/or optical properties changes. Further, and owing to at least their high activity, the metal-semiconductor hybrid structures of the present disclosure can also be employed as catalysts for various reactions, e.g., carbon dioxide reduction reactions, oxygen reduction reactions, hydrogen evolution reactions, and complicated organic reactions, such as annulation chemistry and aerobic dehydrogenation reactions.

For purposes of this present disclosure, and unless otherwise specified, all numerical values within the detailed description and the claims herein are modified by "about" or "approximately" the indicated value, and consider experimental error and variations that would be expected by a person having ordinary skill in the art.

As used herein, the indefinite article "a" or "an" shall mean "at least one" unless specified to the contrary or the context clearly indicates otherwise. For example, aspects comprising "a semiconductor nanoparticle" include aspects comprising one, two, or more semiconductor nanoparticles, unless specified to the contrary or the context clearly indicates only one semiconductor nanoparticle is included.

Metal-Semiconductor Hybrid Structures

The present disclosure generally relates to metal-semiconductor hybrid structures. These metal-semiconductor hybrid structures can be useful as catalysts for, e.g., conversion reactions such as the conversion of carbon dioxide into fuels and chemicals, oxygen reduction reactions for alkaline fuel cells, and light-induced $H_2$ production. According to some aspects, the metal-semiconductor hybrid structure can include at least two components.

The first component can include one or more elements (e.g., metal(s)) from Group 11-Group 14 of the periodic table of the elements and one or more elements (such as one or more non-metal elements and/or metalloids) from Group 15-Group 16 of the periodic table of the elements. The second component can include one or more elements (e.g., metal(s)) from Group 7-Group 11 of the periodic table of elements. In at least one aspect, the first component can be a semiconductor nanoparticle. In at least some aspects, the second component can be a nanocluster. Nanoclusters can be composed either of a single element or of multiple elements, and/or typically have a core size of less than 3 nm or less than 2 nm. In some aspects, the nanocluster is on a surface of the semiconductor nanoparticle. According to some aspects, the first component can serve as a surface on which the second component is grown. In at least one aspect, the first component, the second component, or a combination thereof can facilitate conversion reactions.

According to some aspects, the first component, which can be a semiconductor nanoparticle, can include one or more elements of Group 11-Group 14 of the periodic table of the elements, such as copper (Cu), silver (Ag), gold (Au), zinc (Zn), cadmium (Cd), mercury (Hg), indium (In), lead (Pb), or a combination thereof. The first component can also include one or more elements (such as one or more non-metal elements and/or one or more metalloid elements) from Group 15-Group 16 of the periodic table of the elements, such as nitrogen (N), phosphorus (P), arsenic (As), antimony (Sb), oxygen (O), sulfur (S), selenium (Se), tellurium (Te), or a combination thereof, such as S, Se, Te, P, or a combination thereof.

According to some aspects, the second component, which can be a nanocluster, can include one or more elements of Group 7-Group 11 of the periodic table of the elements, such as manganese (Mn), technetium (Tc), rhenium (Re), iron (Fe), ruthenium (Ru), osmium (Os), cobalt (Co), rhodium (Rh), iridium (Ir), nickel (Ni), palladium (Pd), platinum (Pt), Cu, Ag, Au, or a combination thereof, such as Ru, Rh, Pd, Ag, Os, Ir, Pt, Au, or a combination thereof.

In at least one aspect, the one or more elements of the first component can be the same elements as the one or more elements of the second component. For example, and according to some aspects, a copper-containing cluster can be with, and/or be grown on the surface of, e.g., copper sulfide, copper telluride, and copper selenide. As another example, and according to at least one aspect, a silver-containing cluster can be with and/or be grown on the surface of, e.g., silver sulfide, silver selenide, and silver telluride. In at least one aspect, the one or more elements of the first component can be different elements than the one or more elements of the second component. For example, and according to some aspects, a gold-containing cluster can be with, and/or be grown on the surface of, cadmium sulfide. As another example, a platinum-containing cluster can be with, and/or be grown on the surface, of cadmium sulfide.

In some aspects, an average size of the first component can be from about 3 nm to about 20 nm, such as from about 4 nm to about 19 nm, such as from about 5 nm to about 18 nm, such as from about 6 nm to about 17 nm, such as from about 7 nm to about 16 nm, such as from about 8 nm to about 15 nm, such as from about 9 nm to about 14 nm, such as from about 10 nm to about 13 nm, such as from about 11 nm to about 12 nm. In at least one aspect, the first component can have an average size that is from about 5 nm to about 10 nm or from about 4 nm to about 15 nm. The average size can be measured by transmission electron spectroscopy (TEM). For spherical particles, the average size is the average diameter as measured by TEM, and for non-spherical particles, the average size is an equivalent diameter. The equivalent diameter is based on estimating the particle's volume from TEM and then calculating the equivalent diameter assuming the particle is spherical.

In some aspects, an average size of the second component can be from about 0.5 nm to about 3.0 nm, such as from about 0.6 nm to about 2.9 nm, such as from about 0.7 nm to about 2.8 nm, such as from about 0.8 nm to about 2.7 nm, such as from about 0.9 nm to about 2.6 nm, such as from about 1.0 nm to about 2.5 nm, such as from about 1.1 nm to about 2.4 nm, such as from about 1.2 nm to about 2.3 nm, such as from about 1.3 nm to about 2.2 nm, such as from about 1.4 nm to about 2.1 nm, such as from about 1.5 nm to about 2.0 nm, such as from about 1.6 nm to about 1.9 nm, such as from about 1.7 nm to about 1.8 nm, as determined by TEM as described above for the first component. In at least one aspect the second component can have an average size that is from about 1.5 nm to about 2.0 nm, from about 0.5 nm to about 1.5 nm, or from about 1.0 nm to about 2.5 nm.

In some aspects, a surface area of the first component can be from about 20 $nm^2$ to about 1300 $nm^2$, such as from about 30 $nm^2$ to about 1100 $nm^2$, such as from about 40 $nm^2$ to about 900 $nm^2$, such as from about 50 $nm^2$ to about 700 $nm^2$, such as from about 60 $nm^2$ to about 500 $nm^2$, such as from about 70 $nm^2$ to about 400 $nm^2$, such as from about 80 $nm^2$ to about 325 $nm^2$, such as from about 85 $nm^2$ to about 320 $nm^2$, such as from about 90 $nm^2$ to about 315 $nm^2$, such as from about 95 $nm^2$ to about 310 $nm^2$, such as from about 100 $nm^2$ to about 305 $nm^2$, such as from about 105 $nm^2$ to about 300 $nm^2$, such as from about 110 $nm^2$ to about 295 $nm^2$, such as from about 115 $nm^2$ to about 290 $nm^2$, such as from about 120 $nm^2$ to about 285 $nm^2$, such as from about 125 $nm^2$ to about 280 $nm^2$, such as from about 130 $nm^2$ to about 275 $nm^2$, such as from about 135 $nm^2$ to about 270 $nm^2$, such as from about 140 $nm^2$ to about 265 $nm^2$, such as from about 145 $nm^2$ to about 260 $nm^2$, such as from about 150 $nm^2$ to about 255 $nm^2$, such as from about 155 $nm^2$ to about 250 $nm^2$, such as from about 160 $nm^2$ to about 245 $nm^2$, such as from about 165 $nm^2$ to about 240 $nm^2$, such as from about 170 $nm^2$ to about 235 $nm^2$, such as from about 175 $nm^2$ to about 230 $nm^2$, such as from about 180 $nm^2$ to about 225 $nm^2$, such as from about 185 $nm^2$ to about 220 $nm^2$, such as from about 190 $nm^2$ to about 215 $nm^2$, such as from about 195 $nm^2$ to about 210 $nm^2$, such as from about 200 $nm^2$ to about 205 $nm^2$. In some aspects, the surface area of the first component can be from about 28 $nm^2$ to about 1256 $nm^2$, such as from about 50 $nm^2$ to about 706 $nm^2$, such as from about 78 $nm^2$ to about 314 $nm^2$. The surface area of the first component is determined by the equation $$\text{surface area} = 4\pi r^2$$

where r is the radius of the spherical particle as determined from the diameter according to TEM.

According to some aspects, a surface area of the second component can be from about 0.7 nm² to about 29 nm², such as from about 1.0 nm² to about 28 nm², such as from about 1.5 nm² to about 25 nm², such as from about 2.0 nm² to about 20 nm², such as from about 3.0 nm² to about 19 nm², such as from about 4.0 nm² to about 17.5 nm², such as from about 5.0 nm² to about 16 nm², such as from about 6.0 nm² to about 14.5 nm², such as from about 7.0 nm² to about 13 nm², such as from about 7.1 nm² to about 12.9 nm², such as from about 7.2 nm² to about 12.8 nm², such as from about 7.3 nm² to about 12.7 nm², such as from about 7.4 nm² to about 12.6 nm², such as from about 7.5 nm² to about 12.5 nm², such as from about 7.6 nm² to about 12.4 nm², such as from about 7.7 nm² to about 12.3 nm², such as from about 7.8 nm² to about 12.2 nm², such as from about 7.9 nm² to about 12.1 nm², such as from about 8.0 nm² to about 12.0 nm², such as from about 8.1 nm² to about 11.9 nm², such as from about 8.2 nm² to about 11.8 nm², such as from about 8.3 nm² to about 11.7 nm², such as from about 8.4 nm² to about 11.6 nm², such as from about 8.5 nm² to about 11.5 nm², such as from about 8.6 nm² to about 11.4 nm², such as from about 8.7 nm² to about 11.3 nm², such as from about 8.8 nm² to about 11.2 nm², such as from about 8.9 nm² to about 11.1 nm², such as from about 9.0 nm² to about 11.0 nm², such as from about 9.1 nm² to about 10.9 nm², such as from about 9.2 nm² to about 10.8 nm², such as from about 9.3 nm² to about 10.7 nm², such as from about 9.4 nm² to about 10.6 nm², such as from about 9.5 nm² to about 10.5 nm², such as from about 9.6 nm² to about 10.4 nm², such as from about 9.7 nm² to about 10.3 nm², such as from about 9.8 nm² to about 10.2 nm², such as from about 9.9 nm² to about 10.1 nm². In at least one aspect, the surface area of the second component can be from about 0.8 nm² to about 28.3 nm², such as from about 3.1 nm² to about 19.8 nm², such as from about 7.1 nm² to about 12.6 nm². The surface area of the second component can be determined as described above for the first component.

In at least one aspect, the metal-semiconductor hybrid structure can be characterized by a nanocluster density, which is the number of nanoclusters per volume of semiconductor nanoparticle surface. In some aspects, the nanocluster density can be about 0.05 nm$^{-3}$ to about 0.60 nm$^{-3}$, such as from about 0.06 nm$^{-3}$ to about 0.59 nm$^{-3}$, such as from about 0.07 nm$^{-3}$ to about 0.58 nm$^{-3}$, such as from about 0.08 nm$^{-3}$ to about 0.57 nm$^{-3}$, such as from about 0.09 nm$^{-3}$ to about 0.56 nm$^{-3}$, such as from about 0.10 nm$^{-3}$ to about 0.55 nm$^{-3}$, such as from about 0.11 nm$^{-3}$ to about 0.54 nm$^{-3}$, such as from about 0.12 nm$^{-3}$ to about 0.53 nm$^{-3}$, such as from about 0.13 nm$^{-3}$ to about 0.52 nm$^{-3}$, such as from about 0.14 nm$^{-3}$ to about 0.51 nm$^{-3}$, such as from about 0.15 nm$^{-3}$ to about 0.50 nm$^{-3}$, such as from about 0.16 nm$^{-3}$ to about 0.49 nm$^{-3}$, such as from about 0.17 nm$^{-3}$ to about 0.48 nm$^{-3}$, such as from about 0.18 nm$^{-3}$ to about 0.47 nm$^{-3}$, such as from about 0.19 nm$^{-3}$ to about 0.46 nm$^{-3}$, such as from about 0.20 nm$^{-3}$ to about 0.45 nm$^{-3}$, such as from about 0.21 nm$^{-3}$ to about 0.44 nm$^{-3}$, such as from about 0.22 nm$^{-3}$ to about 0.43 nm$^{-3}$, such as from about 0.23 nm$^{-3}$ to about 0.42 nm$^{-3}$, such as from about 0.24 nm$^{-3}$ to about 0.41 nm$^{-3}$, such as from about 0.25 nm$^{-3}$ to about 0.40 nm$^{-3}$, such as from about 0.26 nm$^{-3}$ to about 0.39 nm$^{-3}$, such as from about 0.27 nm$^{-3}$ to about 0.38 nm$^{-3}$, such as from about 0.28 nm$^{-3}$ to about 0.37 nm$^{-3}$, such as from about 0.29 nm$^{-3}$ to about 0.36 nm$^{-3}$, such as from about 0.30 nm$^{-3}$ to about 0.35 nm$^{-3}$, such as from about 0.31 nm$^{-3}$ to about 0.34 nm$^{-3}$, such as from about 0.32 nm$^{-3}$ to about 0.33 nm. The nanocluster density (number of nanoclusters per volume of semiconductor nanoparticle surface) is determined by the following procedure. First, the number of metal nanoclusters on the surface of the semiconductor nanoparticle is counted through TEM. Second, the volume of semiconductor nanoparticle is based on the average density. Then, the nanocluster density is calculated based on the number of metal nanoclusters divided by the volume of the individual semiconductor nanoparticle.

In some aspects, the metal-semiconductor hybrid structure can have a molar ratio of Group 7-Group 11 metal(s) to Group 11-Group 14 metal(s) that is from about 1:20 to about 1:5, such as from about 1:19 to about 1:6, such as from about 1:18 to about 1:7, such as from about 1:17 to about 1:8, such as from about 1:16 to about 1:9, such as from about 1:15 to about 1:10, such as from about 1:14 to about 1:11, such as from about 1:13 to about 1:12.

In at least one aspect, the metal-semiconductor hybrid structure can have a molar ratio of Group 15-Group 16 element(s) to Group 7-Group 11 metal(s) that is from about 60:1 to about 5:1, such as from about 55:1 to about 10:1, such as from about 50:1 to about 15:1, such as from about 45:1 to about 20:1, such as from about 40:1 to about 25:1, such as from about 35:1 to about 30:1.

According to some aspects, the metal-semiconductor hybrid structure can have a molar ratio of Group 15-Group 16 element(s) to Group 11-Group 14 metal(s) that is from about 1:3 to about 1:1, such as from about 1:2.75 to about 1:1.25, such as from about 1:2.5 to about 1:1.5, such as from about 1:2.25 to about 1:1.75.

For the metal-semiconductor hybrid structures, the molar ratio of Group 7-Group 11 metal(s) to Group 11-Group 14 metal(s), the molar ratio of Group 15-Group 16 element(s) to Group 7-Group 11 metal(s), and the molar ratio of Group 15-Group 16 element(s) to Group 11-Group 14 metal(s) is determined by transmission electron microscopy of the metal-semiconductor hybrid structure being analyzed.

For processes for producing metal-semiconductor hybrid structure, the molar ratio of the Group 7-Group 11 metal(s) to Group 11-Group 14 metal(s) of the metal-semiconductor hybrid structure, the molar ratio of Group 15-Group 16 element(s) to Group 7-Group 11 metal(s) of the metal-semiconductor hybrid structure, and the molar ratio of Group 15-Group 16 element(s) to Group 11-Group 14 metal(s) of the metal-semiconductor hybrid structure is determined based on the starting material molar ratio used for the synthesis.

Processes for Producing Metal-Semiconductor Hybrid Structures

Figure 1:
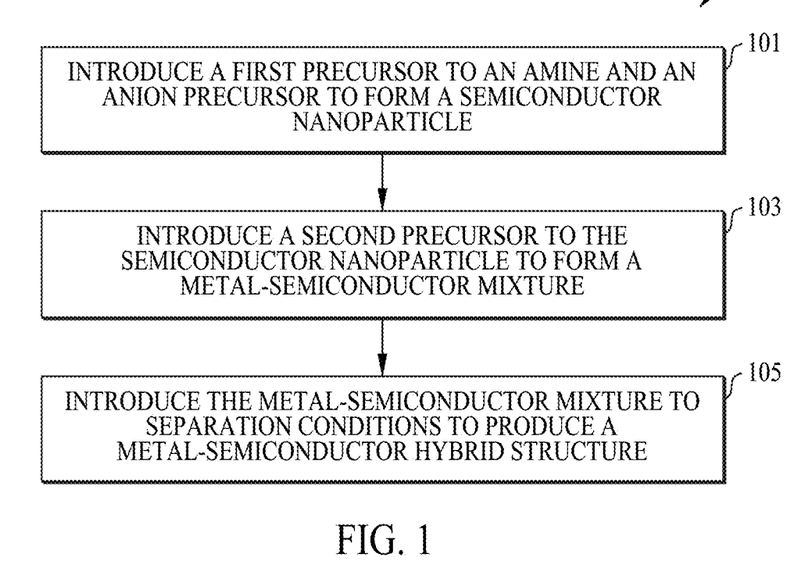
FIG. 1 is a flow diagram of an example process of producing a metal-semiconductor hybrid structure according to at least one aspect of the present disclosure.

FIG. 1 is an example process 100 of producing a metal-semiconductor hybrid structure according to at least one aspect. The example process 100 can include introducing, under first conditions (e.g., first reaction conditions), a first precursor comprising one or more elements (e.g., metal(s)) from Group 11-Group 14 of the periodic table of elements to an amine and an anion precursor (e.g., a Group 15-Group 16 element, such as sulfur) to form a semiconductor nanoparticle comprising a Group 11-Group 14 metal and a Group 15-Group 16 element at operation 101. Here, and as a non-limiting example, the semiconductor nanoparticle can be a cadmium sulfide nanoparticle. The semiconductor nanoparticle can have one or more of those properties described above.

According to at least some aspects, the first precursor comprising one or more elements from Group 11-Group 14 of the periodic table of elements can include Cu, Ag, Au, Zn, Cd, Hg, In, Pb, or a combination thereof. In some aspects, the first precursor can include a ligand such as a halide (e.g., I$^-$, Br$^-$, Cl$^-$, or F$^-$), SCN$^-$, NO$_2^-$, NO$_3^-$, N$_3^-$, OH$^-$, oxalate ($C_2O_4^{2-}$), $H_2O$, acetate ($CH_3COO^-$), acetylacetonate, $O_2^-$, $CN^-$, $OCN^-$, $OCN^-$, $CNO^-$, $NH_2^-$, $NH^{2-}$, $NC^-$, $NCS^-$, $N(CN)_2^-$, pyridine (py), ethylenediamine (en), 2,2'-bipyridine (bipy), $PPh_3$, or a combination thereof. In some aspects, the first precursor can include metal acetates, metal acetylacetonates, and/or metal nitrates. As illustrative, non-limiting examples, the first precursor can include cadmium acetate, zinc acetylacetonate, copper acetylacetate, lead acetylacetonate, and indium acetylacetonate, or a combination thereof.

In at least one aspect, the amine can be, e.g., a primary amine, a secondary amine, a tertiary amine, or a combination thereof. Non-limiting examples of amines can include tetradecylamine (TDA), oleylamine (OLA), octadecylamine (ODA), hexadecylamine (HDA), dodecylamine (DDA), or a combination thereof. According to some aspects, non-limiting examples of the anion precursor can include one or more elements from Group 15-Group 16 of the periodic table of the elements, such as non-metals and/or metalloids, such as N, P, As, O, Sb, S, Se, Te, or a combination thereof, such as S, Se, Te, P, or a combination thereof. In some aspects, the anion precursor may be used in the form of a powder.

According to some aspects, the conditions in operation 101 (first conditions) can include a temperature (e.g., a reaction temperature) and a time (e.g., a reaction time). In at least one aspect, the temperature of the first conditions can be from about 100° C. to about 320° C., such as from about 110° C. to about 310° C., such as from about 120° C. to about 300° C., such as from about 130° C. to about 290° C., such as from about 140° C. to about 280° C., such as from about 150° C. to about 270° C., such as from about 160° C. to about 260° C., such as from about 170° C. to about 250° C., such as from about 180° C. to about 240° C., such as from about 190° C. to about 230° C., such as from about 200° C. to about 220° C. In some aspects, the temperature of the first conditions can be from about 150° C. to about 280° C. or from about 180° C. to about 250° C.

In at least one aspect, the time for the conditions in operation 101 can be at least about 1 minute (min), such as from about 5 min to about 6 hours (h), such as from about 10 min to about 5.5 h, such as from about 15 min to about 5 h, such as from about 30 min to about 4 h, such as from about 45 min to about 3 h, such as from about 1 h to about 2 h.

In some aspects, the first conditions can include stirring, mixing, and/or agitation to ensure homogeneity of the mixture. The first conditions can also include performing the reaction under a non-reactive gas, such as $N_2$ and/or Ar. Any reasonable pressure can be used during the reaction.

According to some aspects, the semiconductor nanoparticle or solution containing the same may be quenched, washed, and/or purified one or more times. The one or more quenching, washing, and/or purification processes can include centrifuging and/or discarding the supernatant. For example, after the semiconductor nanoparticle (or a solution containing the same) has been obtained, a hydrophobic solvent (such as an alcohol solvent, such as ethanol) may be added to the semiconductor nanoparticle (or a solution thereof). This mixture can be centrifuged, the supernatant discarded and the remaining pellet can be dispersed in a suitable solvent, such as ethanol, hexane, toluene, chloroform, or a combination thereof. The resultant pellet and solvent(s) can be centrifuged to provide the semiconductor nanoparticle.

The example process 100 can further include introducing, under second conditions (e.g., second reaction conditions), a second precursor comprising one or more elements (e.g., metal(s)) from Group 7-Group 11 of the periodic table of the elements to the semiconductor nanoparticle to form a metal-semiconductor mixture at operation 103. In at least one aspect, the one or more elements of the first precursor can be the same elements as the one or more elements of the second precursor. For example, and according to some aspects, a copper-containing cluster can be with, and/or be grown on the surface of, e.g., copper sulfide, copper telluride, and copper selenide. In at least one aspect, the one or more elements of the first precursor can be different elements than the one or more elements of the second component. For example, a platinum-containing cluster can be with, and/or be grown on the surface, of cadmium sulfide.

According to some aspects, the second precursor comprising one or more elements from Group 7-Group 11 can include Mn, Tc, Re, Fe, Ru, Os, Co, Rh, Ir, Ni, Pd, Pt, Cu, Ag, Au, or a combination thereof, such as Ru, Rh, Pd, Ag, Os, Ir, Pt, Au, or a combination thereof. In some aspects, the second precursor can include a ligand such as a halide (e.g., $I^-$, $Br^-$, $Cl^-$, or $F^-$) $SCN^-$, $NO_2^-$ (donor atom being oxygen or nitrogen), $NO_3^-$, $N_3^-$, $OH^-$, oxalate ($C_2O_4^{2-}$), $H_2O$, acetate ($CH_3COO^-$), acetylacetonate, $O_2^-$, $CN^-$, $OCN^-$, $OCN^-$, $CNO^-$, $NH_2^-$, $NH^{2-}$, $NC^-$, $NCS^-$, $N(CN)_2^-$, pyridine (py), ethylenediamine (en), 2,2'-bipyridine (bipy), $PPh_3$, or a combination thereof. In some aspects, the second precursor can include metal acetates, metal acetylacetonates, and/or metal nitrates. As illustrative, non-limiting examples, the second precursor can include gold chloride trihydrate, chloroplatinic acid hydrate, palladium acetylacetonate, silver nitrate, or a combination thereof.

In at least one aspect, operation 103 can include the use of an amine. The amine can be, e.g., a primary amine, a secondary amine, a tertiary amine, or a combination thereof. Non-limiting examples of amines can include tetradecylamine (TDA), oleylamine (OLA), octadecylamine (ODA), hexadecylamine (HDA), dodecylamine (DDA), or a combination thereof. In at least one aspect, operation 103 can include the use of a solvent. The solvent can be a hydrophobic solvent, such as aromatic solvents, alkyl solvents, and ether solvents, such as toluene, octadecene, phenyl ether, benzyl ether, or a combination thereof. The inventors have found that the ligands, such as alkylamines, can serve not only as a ligand but also as a reducing agent to grow small-sized nanoclusters on the nanoparticle surface. Moreover, the alkylamine can additionally act as a solvent and/or a surfactant.

According to some aspects, the semiconductor nanoparticle may be used in the form of a solution. In such cases, an amount of solvent sufficient to disperse the semiconductor nanoparticle can be added to the semiconductor nanoparticle. The solution of the semiconductor nanoparticle may then be added to the second precursor.

According to some aspects, the conditions in operation 103 (second conditions) can include a temperature (e.g., a reaction temperature) and a time (e.g., a reaction time). In at least one aspect, the temperature of the second conditions can be more than about 50° C., such as from about 60° C. to about 200° C., such as from about 70° C. to about 190° C., such as from about 80° C. to about 180° C., such as from about 90° C. to about 170° C., such as from about 100° C. to about 160° C., such as from about 110° C. to about 150° C., such as from about 120° C. to about 140° C.

In at least one aspect, the time for the second conditions can be at least about 1 min, such as from about 1 min to about 2 h, such as from about 5 min to about 1.8 h, such as from about 20 min to about 1.5 h, such as from about 30 min to about 75 min, such as from about 45 minutes to about 60 min.

In some aspects, the second conditions can include stirring, mixing, and/or agitation to ensure homogeneity of the mixture. Operation 103 can be performed under a non-reactive gas, such as $N_2$ and/or Ar. Any suitable pressure can be used during the reaction.

According to some aspects, the metal-semiconductor mixture or solution containing the same may be introduced to separation conditions to produce a metal-semiconductor hybrid structure at operation 105. The separation conditions can include quenching, washing, and/or purifying, one or more times. The one or more quenching, washing, and/or purification processes can include centrifuging and/or discarding the supernatant. For example, after the metal-semiconductor mixture (or a solution containing the same) has been obtained, a hydrophobic solvent (such as an alcohol solvent, such as ethanol) may be added to the metal-semiconductor mixture (or a solution thereof). This mixture can be centrifuged, the supernatant discarded and the remaining pellet can be dispersed in an acceptable solvent, such as ethanol, hexane, toluene, chloroform, or a combination thereof. The resultant pellet and solvent(s) can be centrifuged to provide the metal-semiconductor hybrid structure. As a non-limiting example, the metal-semiconductor hybrid structure can be, e.g., Au—CdS, Pt—CdS, and Pd—CdS. The metal-semiconductor hybrid structure can have one or more of those properties described above.

In some aspects, the temperature and the time of the second conditions can be controlled based on the Group 7-Group 11 metal nanocluster being formed and the desired size of the metal nanocluster being formed. As a non-limiting example, and only for illustrative purposes, Au nanoclusters with an average size of about 1.5 nm may be synthesized under second conditions that include a temperature of about 100° C. and a time of about 1 h. Alternatively, and as a non-limiting example, Au nanoclusters with an average size of about 1.5 nm may also be synthesized under second conditions that include a temperature of about 80° C. and a time of about 2 h. Alternatively, and as a non-limiting example, the size of Au nanoclusters can be increased to about 5.0 nm by performing the process with a temperature of about 150° C. or more.

In some non-limiting examples, Pd nanoclusters can be formed under similar second conditions as that of Au nanoclusters. Other nanoclusters, e.g., Pt nanoclusters, can be formed in some non-limiting examples by using a more elevated temperature for the second conditions. For example, Pd nanoclusters having an average size of about 1.7 nm can be formed at temperatures of about 200° C. or less.

Methods of Using Metal-Semiconductor Hybrid Structures

The present disclosure also relates to processes of using the metal-semiconductor hybrid structures. For example, the metal-semiconductor hybrid structures can be used for various reactions—reduction reactions, oxygen reduction reactions, carbon dioxide reduction reactions, hydrogen evolution reactions, and organic reactions such as annulation chemistry and aerobic dehydration reactions. As described above, the properties of the metal-semiconductor hybrid structures made by processes described herein are improved over those structures made by conventional methods. For example, the small-sized structures have a large surface area of the active metal sites available to catalyze desired reactions which increases the activity and atom-economy of these structures over conventional structures. Further, physical properties such as electrochemical, optical, and electrical properties are improved over structures made by conventional methods. Such characteristics enable using the metal-semiconductor hybrid structures in various applications.

In one example, a method of using the metal-semiconductor hybrid structure can include introducing the metal-semiconductor hybrid structure to a reactant to form a product. For example, a process for converting carbon dioxide to conversion product(s) can include introducing the metal-semiconductor hybrid structure to carbon dioxide and obtaining conversion products, e.g., carbon monoxide, methane, ethane, propanol, formic acid, ethanol, allyl alcohol, ethylene, or a combinations thereof. As another example, a process for converting p-nitrophenol to conversion products can include introducing the metal-semiconductor hybrid structure to sodium borohydride and p-nitrophenol, and obtaining conversion products, e.g., 4-aminophenol.

Other non-limiting applications where the metal-semiconductor hybrid structure can be used include gas sensing, water splitting, and biological applications. Gas sensing is used to detect levels of gases, such as $O_2$, CO, and $H_2S$, in certain environments. As an example, an $H_2S$ sensor is used to detect hydrogen sulfide in hydrogen feed streams of fuel cells to prevent catalyst poisoning and to measure the quality of guard beds used to remove sulfur from hydrocarbon fuels. Hydrogen sulfide sensors are also used in personal protective equipment as an alert for the presence of hydrogen sulfide gas. With respect to water sensing, the metal-semiconductor hybrid structure can provide electrons and protons under light irradiation in order to produce hydrogen. Here, the water can be split into hydrogen and oxygen when hydrogen ion receives an electron and hydroxide ion receives a proton. Regarding biological applications, the metal-semiconductor hybrid structures can be used in photoluminescene to label cells for detection in vivo under light irradiation.

Accordingly, and in some aspects, the metal-semiconductor hybrid structure can be used in such applications and/or can be incorporated into desired devices (e.g., reactors, sensor devices, etc.) useful for such applications.

The following examples are put forth so as to provide those of ordinary skill in the art with a complete disclosure and description of how to make and use aspects of the present disclosure, and are not intended to limit the scope of aspects of the present disclosure. Efforts have been made to ensure accuracy with respect to numbers used (e.g. amounts, dimensions, etc.) but some experimental errors and deviations should be accounted for.

EXAMPLES

Cadmium acetate, cadmium acetylacetonate, sulfur powder, dodecylamine (DDA), hexadecylamine (HAD), octadecylamine (ODA), oleylamine (OLA, 70%), gold chloride trihydrate, chloroplatinic acid hydrate, palladium acetylacetonate, silver nitrate, p-nitrophenol, sodium borohydride, toluene (99.9%), acetone (99%), and chloroform (99.9%) were purchased from Sigma-Aldrich. Tetradecylamine (TDA, >96%) was purchased from TCI. Hexane (99%), methanol (99%), and ethanol (200 proof) were purchased from Fisher Chemicals. All chemicals were used as received.

Transmission electron microscopy (TEM) images were captured using an FEI Tecnai 20 microscope with an accelerating voltage of 200 kV.

A UV-Vis-NIR spectrometer (Cary 5000) was used to record the absorption spectra of the semiconductor nanoparticles and metal-semiconductor hybrid structures. For characterization by UV-Vis spectrometry, solvents sufficient to disperse the semiconductor nanoparticles and metal-semiconductor hybrid structures were used such as hydrophobic solvents, such as hexane, toluene, and chloroform.

Example 1: Synthesis of Cadmium Sulfide Nanoparticles 186 mg of cadmium acetylacetonate (0.6 mmol), 5.0 g of TDA, and 38.6 mg of sulfur powder were added into a flask under Argon (Ar) or $N_2$ flow. After Ar or $N_2$ blowing for 10 min, the mixed solution was heated to 220° C. and kept at this temperature for 60 min. Then the reaction solution was cooled to 100° C. and 5 mL of ethanol was added into the flask. The products were separated by centrifuging at 5000 rpm for 5 min. After the supernatant was discarded, 2.0 mL of hexane and 6.0 mL of ethanol were added to the sediment, sequentially, and the mixture was centrifuged at 5000 rpm for 5 min. The washing procedure was repeated twice to remove unreacted precursors and surfactants. The cadmium sulfide was stored in a hydrophobic solvent, e.g., hexane, toluene, or chloroform.

Example 2: Growth of Nanoclusters on Cadmium Sulfide Surface 2.0 g of TDA, 10 mL of toluene, and 10 mg of gold chloride trihydrate (0.025 mmol) were loaded in a 25 mL three-neck flask where oxygen was removed for 10 min. Then 2.0 mL of cadmium sulfide solution (cadmium sulfide in toluene, 10 mg/mL) was injected into the flask under Ar flow. Alternatively, the cadmium sulfide solution can be cadmium sulfide in octadecene, phenyl ether, among other solvents. After 20 min of Ar flow, the flask was heated to 100° C. The Ar flow aids in removing oxygen. The reaction was held at 100° C. for 60 min, and then the reaction solution was cooled to room temperature and 5 mL of ethanol (or another hydrophilic solvent such as methanol and acetone) was added. The products were separated by centrifuging at 5000 rpm for 5 min. After the supernatant was discarded, 2.0 mL of hexane and 6.0 mL of ethanol were added to the sediment, sequentially, and the mixture was centrifuged at 5000 rpm for 5 min. The washing procedure was repeated twice to remove unreacted precursors and surfactants. The gold-cadmium sulfide nanocluster was stored in hydrophobic solvents (for example: hexane, toluene and chloroform) before characterization.

Figure 2:
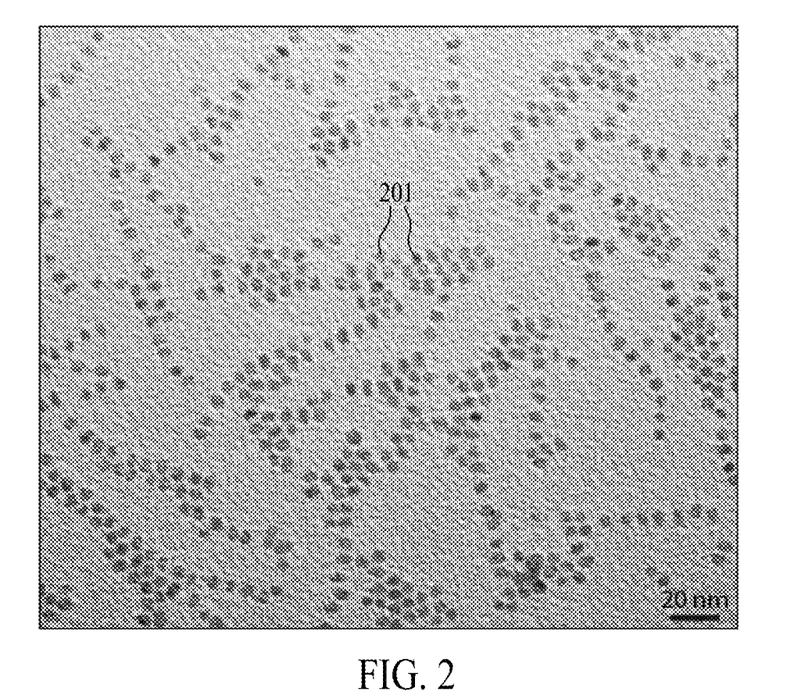
FIG. 2 is a transmission electron microscope (TEM) image of example semiconductor nanoparticles (cadmium sulfide (CdS) nanoparticles) according to at least one aspect of the present disclosure.
Figure 3:
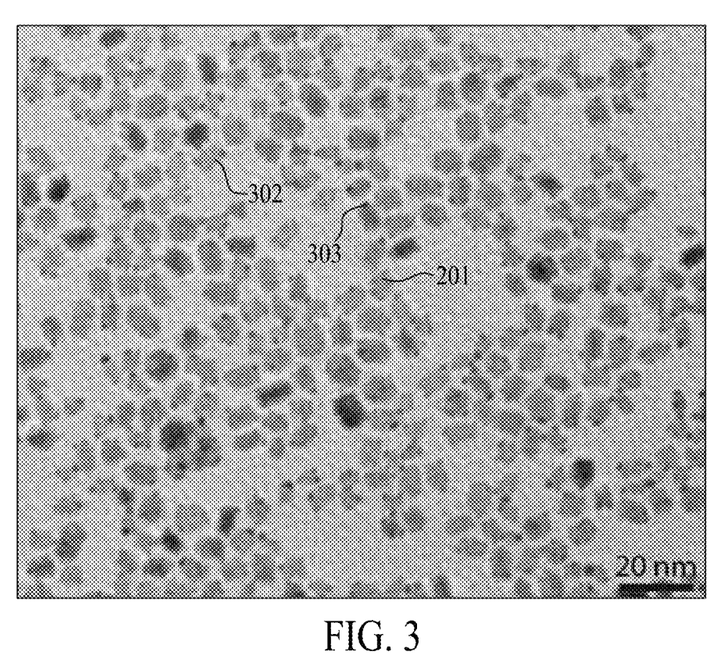
FIG. 3 is a TEM image of an example metal-semiconductor hybrid structure (Au nanoclusters with CdS nanoparticles) according to at least one aspect of the present disclosure.

FIG. 2 shows uniform cadmium sulfide (CdS) nanoparticles 201, as example semiconductor nanoparticles, that were synthesized at a temperature of about 220° C. for a reaction time of about 60 min. The TEM image indicated that the average size of cadmium sulfide was about 4.8±0.6 nm. As shown in FIG. 3, after growing Au nanoclusters on CdS surface, Au nanoclusters appeared to be much darker on the surface of CdS due to their different contrasts. FIG. 3 also indicates uniform Au nanoclusters (302, 303) with an average size of about 1.5 nm were well-dispersed on the CdS nanoparticle surfaces 201. The 1.5 nm Au nanoclusters may be synthesized at about 100° C. for about 1 hour. The average size of Au nanoclusters can be controlled and increased to about 5.0 nm by raising the temperature to about 150° C., while 1.5 nm Au nanoclusters may be prepared on a CdS surface when keeping the reaction temperature at about 80° C. for about 2 hours.

Figure 4:
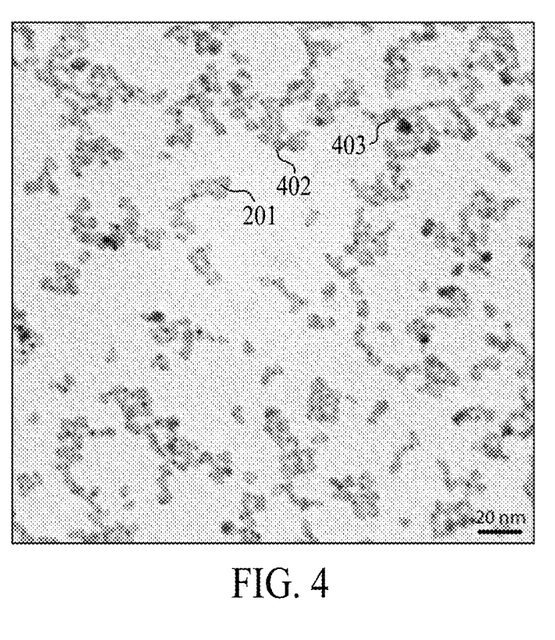
FIG. 4 is a TEM image of an example metal-semiconductor hybrid structure (Pt nanoclusters with CdS nanoparticles) according to at least one aspect of the present disclosure.
Figure 5:
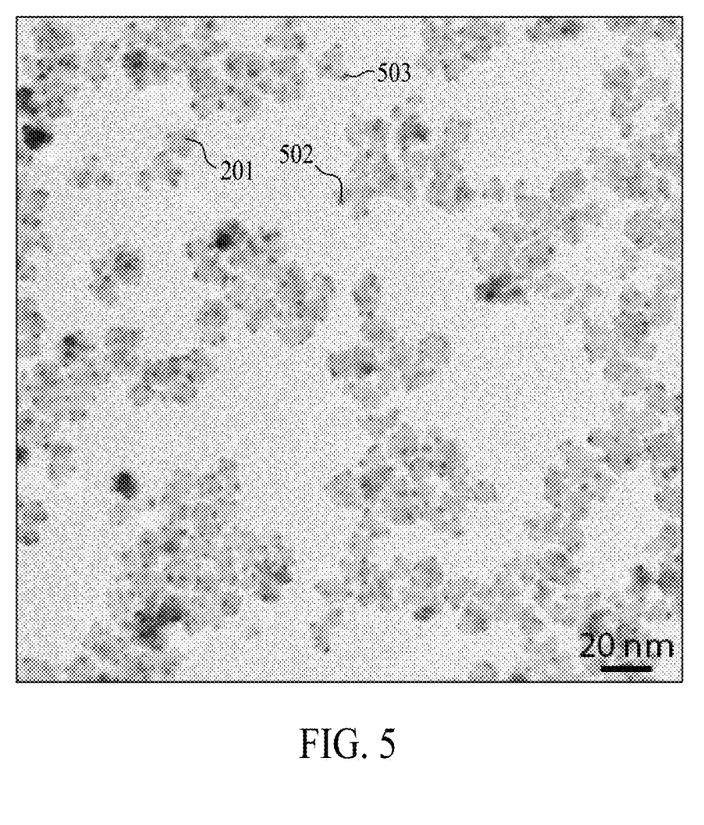
FIG. 5 is a TEM image of an example metal-semiconductor hybrid structure (Pd nanoclusters with CdS nanoparticles) according to at least one aspect of the present disclosure.

Not limited to the growth of Au nanoclusters, methods of the present disclosure can be extended to grow Pt nanoclusters (402, 403) on CdS nanoparticle surfaces 201 and Pd nanoclusters (502, 503) on CdS nanoparticle surfaces 201, as shown in the TEM images of FIG. 4 and FIG. 5, respectively. The average sizes of both the Pt and Pd nanoclusters are less than about 2.0 nm. Specifically, the average size of the Pt nanoclusters was about 1.0 nm and the average size of the Pd nanoclusters was about 1.7 nm. The growth temperature of the Pt nanoclusters is about 200° C., while the growth temperature of the Pd nanoclusters is similar to that of the Au nanoclusters.

Figure 6:
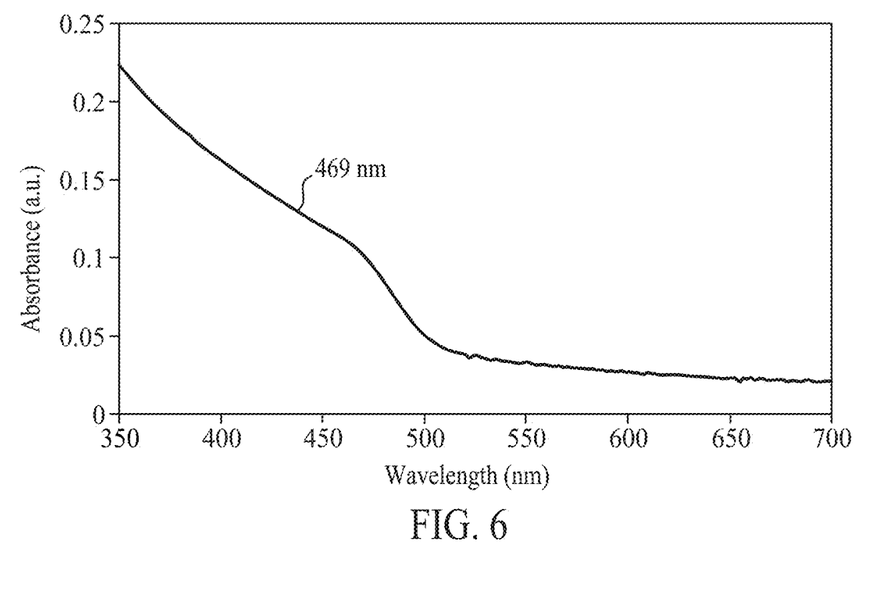
FIG. 6 is an ultraviolet-visible (UV-Vis) absorption spectrum of example semiconductor nanoparticles (CdS nanoparticles) according to at least one aspect of the present disclosure.

FIG. 6 is a UV-Vis absorption spectrum of the as-synthesized CdS nanoparticles in hexane. The absorption peak was well-defined with a maximum at about 469 nm. It is known that the lowest optical transition is associated with the excitonic absorption spectrum and thus the absorption spectrum provides a simple way to determine the nanocrystal band gap. The band gap of CdS nanoparticles with an average size of 4.8 nm is about 2.65 eV. Compared to bulk CdS (2.42 eV), the absorption peak of CdS nanoparticles is blue shifted, indicating a quantum size effect. The quantum size effect indicates the band gap of semiconductor nanoparticles will increase with a decreasing in the size of semiconductor nanoparticles. The results show that CdS nanoparticles were synthesized as described herein.

Figure 7:
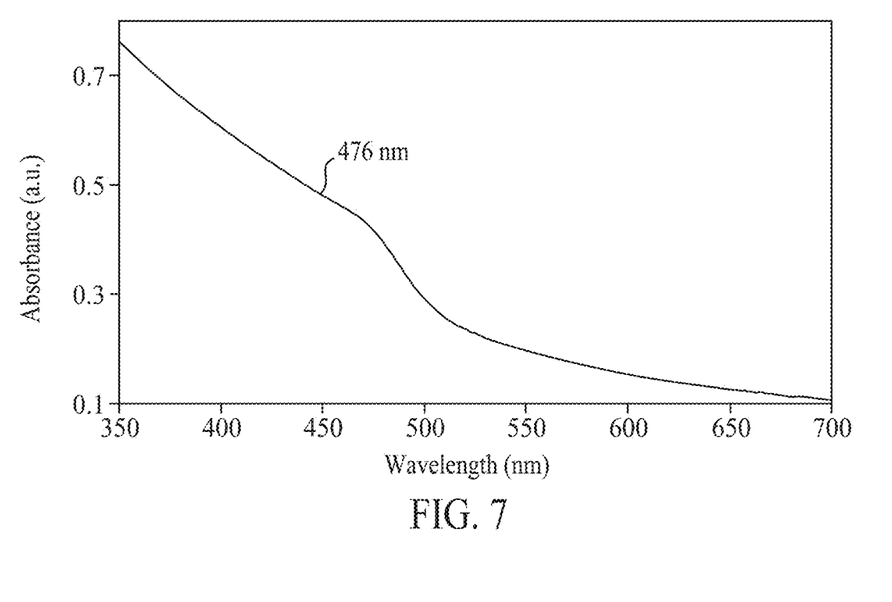
FIG. 7 is a UV-Vis absorption spectrum of an example metal-semiconductor hybrid structure (Au nanoclusters with CdS nanoparticles) according to at least one aspect of the present disclosure.

As shown in the UV-Vis absorption spectrum of FIG. 7, the Au—CdS hybrid nanostructures had a broad absorption peak centered at 476 nm. Compared to pure CdS nanoparticles, the absorption peak had a red-shift and no obvious Au plasmonic peak had been observed, which was consistent with published reports on $Au_{144}$ nanoclusters. Accordingly, the Au—CdS nanostructures were synthesized as described herein.

Example 3: Performance as Catalyst

Figure 8:
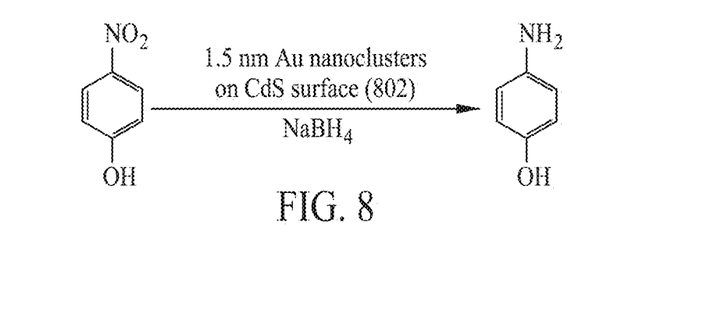
FIG. 8 is a reaction scheme of the catalytic reduction of p-nitrophenol using an example metal-semiconductor hybrid structure (Au nanoclusters with CdS nanoparticles) according to at least one aspect of the present disclosure.

To evaluate the catalytic performance of the metal-semiconductor hybrid structures, the Au—CdS hybrid structures 802 were used to catalyze the p-nitrophenol 801 reduction reaction to 4-aminophenol 803 with sodium borohydride ($NaBH_4$), as shown in FIG. 8. In an example, the reaction of p-nitrophenol to 4-aminophenol can be performed by mixing the p-nitrophenol with $NaBH_4$ in e.g., an aqueous solution, and then adding in a metal-semiconductor hybrid structure. In an example, the mass catalytic activity of the metal-semiconductor hybrid structure was observed at about 0.12 $s^{-1} g^{-1}$.

Figure 9:
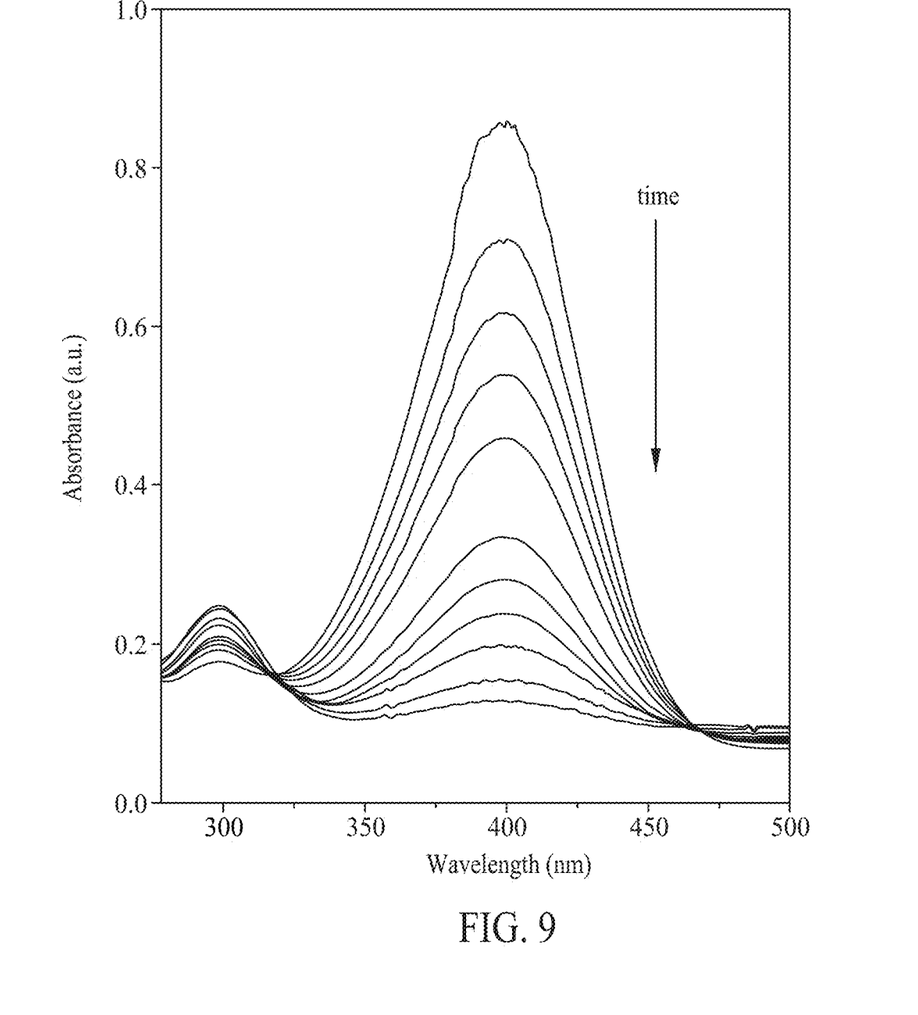
FIG. 9 is overlaid UV-Vis absorption spectra of the catalytic reduction of p-nitrophenol at different reaction periods using an example metal-semiconductor hybrid structure (Au nanoclusters on CdS nanoparticles) according to at least one aspect of the present disclosure.

FIG. 9 is a UV-Vis absorption spectra of the catalytic reduction of p-nitrophenol at different reaction periods using an example metal-semiconductor hybrid structure. The absorbance of p-nitrophenol at 400 nm was monitored, and a gradual reduction of the absorbance was observed over time. The time for each absorption peak, from top to bottom, is as follows: 0 sec, 11 sec, 24 sec, 35 sec, 50 sec, 66 sec, 80 sec, 110 sec, 142 sec, 175 sec, and 210 sec.

While not being bound by theory, the small size of the nanoclusters as well as the small size of the metal-semiconductor hybrid structures are believed to contribute to the catalytic activity. In addition, the catalytic performance provides evidence of the electron-hole separation of the example metal-semiconductor hybrid structure.

The results indicate that, advantageously, the size of the metal nanocluster can be accurately controlled by processes described herein. Such small metal nanoclusters have a large surface area of the active metal sites available to catalyze reactions, e.g., reductions and hydrogen evolution reactions. Providing accessible surface area on a per mass basis can significantly reduce production costs. As such, the nanoclusters of the present disclosure can provide higher catalyst activity and improved atom economy as compared to nanoclusters formed by conventional methods. In addition, the drawbacks of conventional methods such as the oxidation of the metals and/or other precursors during synthesis, as well as the slow growth rate of nanoclusters, can be overcome. Processes of the present disclosure can be easily scaled-up with lower production costs relative to conventional methods.

Aspects Listing

The present disclosure provides, among others, the following aspects, each of which can be considered as optionally including any alternate aspects:

Clause 1. A process for producing a metal-semiconductor hybrid structure, comprising:
  introducing, under first conditions, a first precursor comprising a metal from Group 11-Group 14 to an amine and an anion precursor to form a semiconductor nanoparticle comprising the Group 11-Group 14 metal;
  introducing, under second conditions, a second precursor comprising a metal from Group 7-Group 11 to the semiconductor nanoparticle to form a metal-semiconductor mixture, the metal of the first precursor being the same or different than the metal of the second precursor; and
  introducing the metal-semiconductor mixture to separation conditions to produce the metal-semiconductor hybrid structure.

Clause 2. The process of Clause 1, wherein the anion precursor comprises an element from Group 15-Group 16.

Clause 3. The process of Clause 2 or Clause 3, wherein the metal-semiconductor hybrid structure further comprises the Group 15-Group 16 element.

Clause 4. The process of Clause 2 or Clause 3, wherein the Group 15-Group 16 element comprises S, Se, Te, P, or a combination thereof.

Clause 5. The process of any one of Clauses 1-4, wherein the metal of the first precursor is different than the metal of the second precursor.

Clause 6. The process of any one of Clauses 1-5, wherein the Group 11-Group 14 metal of the first precursor comprises Cd, Zn, Cu, Pb, Ag, Hg, In, or a combination thereof.

Clause 7. The process of any one of Clauses 1-6, wherein the Group 7-Group 11 metal of the second precursor comprises Ru, Rh, Pd, Ag, Os, Ir, Pt, Au, or a combination thereof.

Clause 8. The process of any one of Clauses 1-7, wherein the Group 7-Group 11 metal of the second precursor comprises Co, Ni, Fe, or a combination thereof.

Clause 9. The process of any one of Clauses 1-8, wherein:
  the Group 11-Group 14 metal of the first precursor comprises Cd;
  the Group 7-Group 11 metal of the second precursor comprises Au, Pd, or Pt; or
  a combination thereof.

Clause 10. The process of any one of Clauses 1-9, wherein the amine is an alkylamine.

Clause 11. The process of Clause 10, wherein the alkylamine comprises tetradecylamine (TDA), oleylamine (OLA), octadecylamine (ODA), hexadecylamine (HDA), dodecylamine (DDA), and a combination thereof.

Clause 12. The process of any one of Clauses 1-11, wherein the second conditions comprise:
  heating the metal-semiconductor mixture at a temperature from about 60° C. to about 200° C.;
  mixing the metal-semiconductor mixture for a time of about 2 hours or less; or
  a combination thereof.

Clause 13. The process of any one of Clauses 1-12, wherein the metal-semiconductor hybrid structure has a molar ratio of Group 7-Group 11 metal to Group 11-Group 14 metal from about 1:20 to about 1:5.

Clause 14. The process of any one of Clauses 1-13, wherein introducing the second precursor to the semiconductor nanoparticle further comprises introducing an alkylamine to the second precursor and the semiconductor nanoparticle to form the metal-semiconductor mixture.

Clause 15. The process of any one of Clauses 1-14, wherein the metal-semiconductor hybrid structure comprises a first component comprising the Group 11-Group 14 metal, a second component comprising the Group 7-Group 11 metal, and the second component is on a surface of the first component.

Clause 16. The process of Clause 15, wherein the second component is a nanocluster.

Clause 17. The process of Clause 15 or Clause 16, wherein:
  an average size of the first component is from about 3 nm to about 20 nm, as determined by transmission electron microscopy;
  an average size of the second component is from about 0.5 nm to about 3 nm, as determined by transmission electron microscopy; or
  a combination thereof.

Clause 18. The process of any one of Clauses 15-17, wherein:
  the first component has an average surface area from about 28 $nm^2$ to about 1300 $nm^2$;
  the second component has an average surface area from about 0.7 $nm^2$ to about 29 $nm^2$; or
  a combination thereof.

Clause 19. A metal-semiconductor hybrid structure, comprising:
  a first component comprising a metal from Group 11-Group 14 and an element from Group 15-Group 16; and
  a second component comprising a metal from Group 7-Group 11, wherein:
    the Group 11-Group 14 metal of the first component is the same or different than the Group 7-Group 11 metal of the second component,
    an average size of the first component is from about 3 nm to about 20 nm as determined by transmission electron microscopy, and
    an average size of the second component is from about 0.5 nm to about 3 nm as determined by transmission electron microscopy.

Clause 20. The metal-semiconductor hybrid structure of Clause 19, wherein the Group 11-Group 14 metal of the first component is different than the Group 7-Group 11 metal of the second component.

Clause 21. The metal-semiconductor hybrid structure of Clause 19 or Clause 20, wherein the first component is a semiconductor nanoparticle, the second component is a nanocluster, and the nanocluster is on a surface of the semiconductor nanoparticle.

Clause 22. The metal-semiconductor hybrid structure of any one of Clauses 19-21, wherein: the Group 11-Group 14 metal comprises Cd, Zn, Cu, Pb, Ag, Hg, In, or a combination thereof; the Group 7-Group 11 metal comprises Ru, Rh, Pd, Ag, Os, Ir, Pt, Au, Co, Ni, Fe, or a combination thereof; or a combination thereof.

Clause 23. The metal-semiconductor hybrid structure of any one of Clauses 19-22, wherein:
the average size of the first component is from about 4 nm to about 15 nm;
the average size of the second component is from about 0.5 nm to about 1.5 nm;
the metal-semiconductor hybrid structure has a nanocluster density from about 0.05 nm$^{-3}$ to about 0.60 nm$^{-3}$; or
a combination thereof.

Clause 24. The metal-semiconductor hybrid structure of any one of Clauses 19-23, wherein the metal-semiconductor hybrid structure comprises a molar ratio of Group 7-Group 11 metal to Group 11-Group 14 metal from about 1:20 to about 1:5.

Clause 25. A process for converting carbon dioxide to a conversion product, comprising:
introducing carbon dioxide to the metal-semiconductor hybrid structure according to any one of Clauses 19-23; and
obtaining the conversion product.

Clause 26. A process for converting 4-nitrophenol to a conversion product, comprising:
introducing 4-nitrophenol to the metal-semiconductor hybrid structure according to any one of Clauses 19-23; and
obtaining the conversion product.

Clause 27. A material, comprising:
a first component comprising a metal from Group 11-Group 14 and an element from Group 15-Group 16; and
a second component comprising a metal from Group 7-Group 11, wherein:
the Group 11-Group 14 metal of the first component is the same or different than the Group 7-Group 11 metal of the second component,
an average size of the first component is from about 3 nm to about 20 nm as determined by transmission electron microscopy, and
an average size of the second component is from about 0.5 nm to about 3 nm as determined by transmission electron microscopy.

Clause 28. The metal-semiconductor hybrid structure of Clause 27, wherein the Group 11-Group 14 metal of the first component is different than the Group 7-Group 11 metal of the second component.

Clause 29. The metal-semiconductor hybrid structure of Clause 27 or Clause 28, wherein the first component is a semiconductor nanoparticle, the second component is a nanocluster, and the nanocluster is on a surface of the semiconductor nanoparticle.

Clause 30. The metal-semiconductor hybrid structure of any one of Clauses 27-29, wherein:
the Group 11-Group 14 metal comprises Cd, Zn, Cu, Pb, Ag, Hg, In, or a combination thereof;
the Group 7-Group 11 metal comprises Ru, Rh, Pd, Ag, Os, Ir, Pt, Au, Co, Ni, Fe, or a combination thereof; or
a combination thereof.

Clause 31. The metal-semiconductor hybrid structure of any one of Clauses 27-30, wherein:
the average size of the first component is from about 4 nm to about 15 nm;
the average size of the second component is from about 0.5 nm to about 1.5 nm; the metal-semiconductor hybrid structure has a nanocluster density from about 0.05 nm$^{-3}$ to about 0.60 nm$^{-3}$; or
a combination thereof.

Clause 32. The metal-semiconductor hybrid structure of any one of Clauses 27-31, wherein the metal-semiconductor hybrid structure comprises a molar ratio of Group 7-Group 11 metal to Group 11-Group 14 metal from about 1:20 to about 1:5.

Clause 33. A process for converting carbon dioxide to a conversion product, comprising:
introducing carbon dioxide to the metal-semiconductor hybrid structure according to any one of Clauses 27-32; and
obtaining the conversion product.

Clause 34. A process for converting 4-nitrophenol to a conversion product, comprising:
introducing 4-nitrophenol to the metal-semiconductor hybrid structure according to any one of Clauses 27-32; and
obtaining the conversion product.

All documents described herein are incorporated by reference herein, including any priority documents and/or testing procedures to the extent they are not inconsistent with this text. Further, all documents and references cited herein, including testing procedures, publications, patents, journal articles, etc. are herein fully incorporated by reference for all jurisdictions in which such incorporation is permitted and to the extent such disclosure is consistent with the description of the present disclosure. As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "Is" preceding the recitation of the composition, element, or elements and vice versa, e.g., the terms "comprising," "consisting essentially of," "consisting of" also include the product of the combinations of elements listed after the term.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

What is claimed is:

1. A process for producing a metal-semiconductor hybrid structure, comprising:
introducing a first precursor comprising a Group 11-Group 14 metal to an amine and an anion precursor to form a semiconductor nanoparticle comprising the Group 11-Group 14 metal; and
heating a mixture comprising the semiconductor nanoparticle and a second precursor comprising a Group 7-Group 11 metal at a temperature from about 60° C. to the semiconductor nanoparticle to produce the metal-semiconductor hybrid structure, the Group 11-Group 14 metal of the first precursor and the Group 7-Group 11 metal of the second precursor being the same or different.

2. The process of claim 1, wherein the heating the mixture comprising the semiconductor nanoparticle and the second precursor is performed for a time of about 2 hours or less.

3. The process of claim 1, wherein:
the anion precursor comprises a Group 15-Group 16 element; and
the metal-semiconductor hybrid structure further comprises the Group 15-Group 16 element.

4. The process of claim 3, wherein the Group 15-Group 16 element comprises S, Se, Te, P, or combinations thereof.

5. The process of claim 1, wherein the Group 11-Group 14 metal of the first precursor and the Group 7-Group 11 metal of the second precursor are different.

6. The process of claim 1, wherein:
the Group 11-Group 14 metal of the first precursor comprises Cd, Zn, Cu, Pb, Ag, Hg, In, or combinations thereof; or
the Group 7-Group 11 metal of the second precursor comprises Ru, Rh, Pd, Ag, Os, Ir, Pt, Au, or combinations thereof.

7. The process of claim 1, wherein the Group 7-Group 11 metal of the second precursor comprises Co, Ni, Fe, or combinations thereof.

8. The process of claim 1, wherein:
the Group 11-Group 14 metal of the first precursor comprises Cd;
the Group 7-Group 11 metal of the second precursor comprises Au, Pd, or Pt; or
or combinations thereof.

9. The process of claim 1, wherein the amine is an alkylamine.

10. The process of claim 1, wherein the metal-semiconductor hybrid structure comprises:
a first component comprising the Group 11-Group 14 metal; and
a second component comprising the Group 7-Group 11 metal, wherein the second component is on a surface of the first component.

11. The process of claim 10, wherein:
an average size of the first component is from about 3 nm to about 20 nm, as determined by transmission electron microscopy;
an average size of the second component is from about 0.5 nm to about 3 nm, as determined by transmission electron microscopy;
the first component has an average surface area from about 28 nm$^2$ to about 1300 nm$^2$;
the second component has an average surface area from about 0.7 nm$^2$ to about 29 nm$^2$; or
combinations thereof.

12. The process of claim 1, wherein:
the metal-semiconductor hybrid structure has a molar ratio of the Group 7-Group 11 metal to Group 11-Group 14 metal that is from about 1:20 to about 1:5;
when the metal-semiconductor hybrid structure further comprises a Group 15-Group 16 element, the metal-semiconductor hybrid structure has a molar ratio of the Group 15-Group 16 element to the Group 7-Group 11 metal that is from about 60:1 to about 5:1;
the metal-semiconductor hybrid structure further comprises a Group 15-Group 16 element, the metal-semiconductor hybrid structure has a molar ratio of the Group 15-Group 16 element to the Group 11-Group 14 metal that is from about 1:3 to about 1:1; or
combinations thereof.

13. A process for producing a metal-semiconductor hybrid structure, comprising:
introducing a first precursor comprising a Group 11-Group 14 metal to an alkylamine and an anion precursor comprising a Group 15-Group 16 element to form a semiconductor nanoparticle comprising the Group 11-Group 14 metal and the Group 15-Group 16 element; and
heating a mixture comprising the semiconductor nanoparticle and a second precursor comprising a Group 7-Group 11 metal at a temperature from about 60° C. to about 200° C. to produce the metal-semiconductor hybrid structure comprising the Group 11-Group 14 metal, the Group 15-Group 16 element, and the Group 7-Group 11 metal, the Group 11-Group 14 metal of the first precursor and the Group 7-Group 11 metal of the second precursor being the same or different.

14. The process of claim 13, wherein the heating the mixture comprising the semiconductor nanoparticle and the second precursor is performed for a time of about 2 hours or less.

15. The process of claim 13, wherein the Group 15-Group 16 element comprises S, Se, Te, P, or combinations thereof.

16. The process of claim 13, wherein the Group 11-Group 14 metal of the first precursor and the Group 7-Group 11 metal of the second precursor are different.

17. The process of claim 13, wherein:
the Group 11-Group 14 metal of the first precursor comprises Cd, Zn, Cu, Pb, Ag, Hg, In, or combinations thereof; or
the Group 7-Group 11 metal of the second precursor comprises Ru, Rh, Pd, Ag, Os, Ir, Pt, Au, or combinations thereof.

18. The process of claim 13, wherein the Group 7-Group 11 metal of the second precursor comprises Co, Ni, Fe, or combinations thereof.

19. The process of claim 13, wherein:
the Group 11-Group 14 metal of the first precursor comprises Cd;
the Group 7-Group 11 metal of the second precursor comprises Au, Pd, or Pt; or
or combinations thereof.

20. The process of claim 13, wherein the metal-semiconductor hybrid structure has:
a molar ratio of the Group 7-Group 11 metal to Group 11-Group 14 metal that is from about 1:20 to about 1:5;
a molar ratio of the Group 15-Group 16 element to the Group 7-Group 11 metal that is from about 60:1 to about 5:1;
a molar ratio of the Group 15-Group 16 element to the Group 11-Group 14 metal that is from about 1:3 to about 1:1; or
combinations thereof.

* * * * *